United States Patent [19]

Imai

[11] Patent Number: 4,680,659
[45] Date of Patent: Jul. 14, 1987

[54] TAPE DRIVE MECHANISM HAVING TORQUE TRANSMITTING GEAR ASSEMBLIES

[75] Inventor: Kaetsu Imai, Maebashi, Japan

[73] Assignee: Victor Company of Japan, Limited, Yokohama, Japan

[21] Appl. No.: 513,137

[22] Filed: Jul. 12, 1983

[30] Foreign Application Priority Data

Jul. 16, 1982 [JP] Japan .......................... 57-107865[U]

[51] Int. Cl.$^4$ ...................... G11B 5/008; G11B 15/00; G11B 15/32; G65H 16/10
[52] U.S. Cl. .................................. 360/96.3; 360/137; 242/201
[58] Field of Search ........................ 360/96.3, 96.1, 93, 360/137; 242/201, 202, 203, 204, 61.4

[56] References Cited

U.S. PATENT DOCUMENTS

| | | | |
|---|---|---|---|
| 4,238,808 | 12/1980 | Tomita | 360/96.1 |
| 4,263,631 | 4/1981 | Takanashi | 360/96.3 |
| 4,383,282 | 5/1983 | Osanai | 360/96.3 |
| 4,399,475 | 8/1963 | Shimomae | 360/96.3 |
| 4,453,189 | 6/1984 | Ida | 360/96.3 |

FOREIGN PATENT DOCUMENTS 2751375 4/1979 Fed. Rep. of Germany.
2933735 3/1980 Fed. Rep. of Germany.

*Primary Examiner*—Robert S. Tupper
*Assistant Examiner*—Melissa J. Koval
*Attorney, Agent, or Firm*—Pollock, Vande Sande & Priddy

[57] ABSTRACT

A tape drive mechanism includes a first gear assembly having a first gear mounted on a shaft driven by a motor and a second gear slip-frictionally coupled to the shaft in coaxial relationship with the first gear. Third and fourth slip-frictionally coupled gears form a second gear assembly which are engaged with the first gear and a takeup reel drive gear, respectively, during playback modes. A third gear assembly is provided to engage with the second gear and the takeup reel drive gear during fast-forward modes. Further included is a fourth gear assembly which is engageable with the second gear and a supply reel drive gear during rewind modes. A timing lever is provided to prevent the fourth gear assembly from engaging with the second gear and the supply gear until recording mode is completely terminated should a manual command for rewind operation occur during such modes.

5 Claims, 6 Drawing Figures

TAPE DRIVE MECHANISM HAVING TORQUE TRANSMITTING GEAR ASSEMBLIES

BACKGROUND OF THE INVENTION

The present invention relates generally to tape recorders, and in particular to a reel drive mechanism.

The reel drive mechanism of conventional tape recorders employs an idler and one or more belt-and-pulley systems by way of which the motor driven torque is transmitted selectively to either the supply or takeup reel. During search modes in which the tape is transported at high speed while keeping slight pressure contact with the playback head, an increased load will be placed on the drive system, generating an increased friction therein and hence a failure in the system.

SUMMARY OF THE INVENTION

It is therefore an important object of the present invention to provide a tape recorder mechanism, particularly suitable for portable cassette recorders, which ensures a high level of reliability for transmitting motor driven torque to the tape reels.

The present invention is distinguished from the prior art in that it eliminates the conventional idler and belt-drive systems and employs instead gear assemblies which are free from excessive amounts of friction even if the tape load is increased.

The tape drive mechanism of the invention comprises a plurality of manually operated function bars for effecting recording, playback, fast-forward, and rewind operations, each of the bars being movable from a nonworking position to a working position in response to manual operation, a supply gear coaxially coupled to a spindle adapted for coupling with a first tape reel, and a takeup gear coaxially coupled to a spindle adapted for coupling with a second tape reel. Included are a first gear assembly having a first gear mounted on a shaft driven by a motor and a second gear slip-frictionally coupled to the shaft in coaxial relationship with the first gear. A second gear assembly includes a pair of third and fourth slip-frictionally coupled gears and means for engaging the third and fourth gears with the first gear and the takeup gear, respectively, when the playback function bar is operated. A third gear assembly is provided to engage with the second gear and the takeup gear in response to the fast-forward function bar being moved to the working position. Further included is a fourth gear assembly which is engageable with the second gear and the supply gear when the rewind function bar is operated.

The mechanism is therefore constructed by a system of gears through a slip-friction mechanism which ensures calculated amounts of slippage and friction between the two tape reels. No friction and slipping thus occurs in parts other than the slip-friction mechanisms.

According to a feature of the invention, the mechanism further includes a timing means engaged with the record function bar for preventing the fourth gear assembly from engaging with the second gear and the takeup gear if the rewind function bar is operated when the record function bar is still in the working position until the record function bar is restored to the nonworking position. This feature prevents erasing of prerecorded material when the rewind bar is inadvertently operated before the recording mode is not completely finished.

BRIEF DESCRIPTION OF THE DRAWINGS

The present invention will be described in further detail with reference to the accompanying drawings, in which.

DETAILED DESCRIPTION

Figure 2:
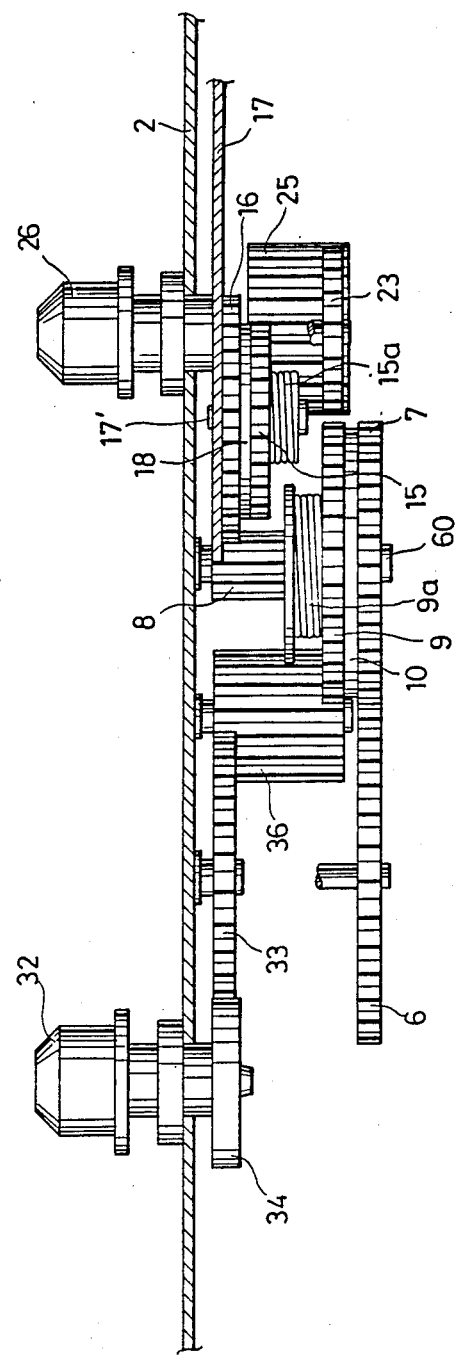
FIG. 2 is a side view illustrating part of the gear assemblies of the mechanism.

Referring to the drawings various parts of a tape drive mechanism of the invention are shown in separate figures. A flywheel 1, rotatably mounted on a chassis 2, is driven by a motor 3 with a belt 4. A gear 5, mounted on the flywheel 1, is in mesh with a spur gear 6 which in turn is meshed with a gear 7. As shown in FIG. 2, the gear 7 is fixedly mounted on a shaft 60 and forms part of a first slip-friction gear assembly which includes a gear 9 slip-frictionally coupled with the gear 7 by means of a disc 10 of friction material under pressure provided by a spring 9a, and a small gear 8 fixedly coupled to the shaft 60. Therefore, the motor drive torque is transmitted with slip-friction coupling to the gear 9 and without slip-friction coupling to the gear 8.

A second slip-friction gear assembly is provided which is located between the first slip-friction gear assembly and a takeup gear 25 which carries a takeup spindle 26 on the other side of the chassis 2. The second slip-friction gear assembly comprises a bell crank 17 having a pivot shaft 17', gears 15, 16 mounted on the shaft 17', and a friction disc 18 disposed between gears 15 and 16 under pressure provided by a spring 15a. The bell crank 17 is pivoted at 17a and biased in the clockwise direction by a spring 41 which extends between it and a bell crank 22 whose function will be described with reference to FIG. 3. The effect of spring 41 is to urge the gears 15 and 16 in a direction tending to keep them in contact with the gears 25 and 8, respectively, to transmit the motor drive torque through the second slip-friction gear assembly to the takeup gear 25.

Figure 1:
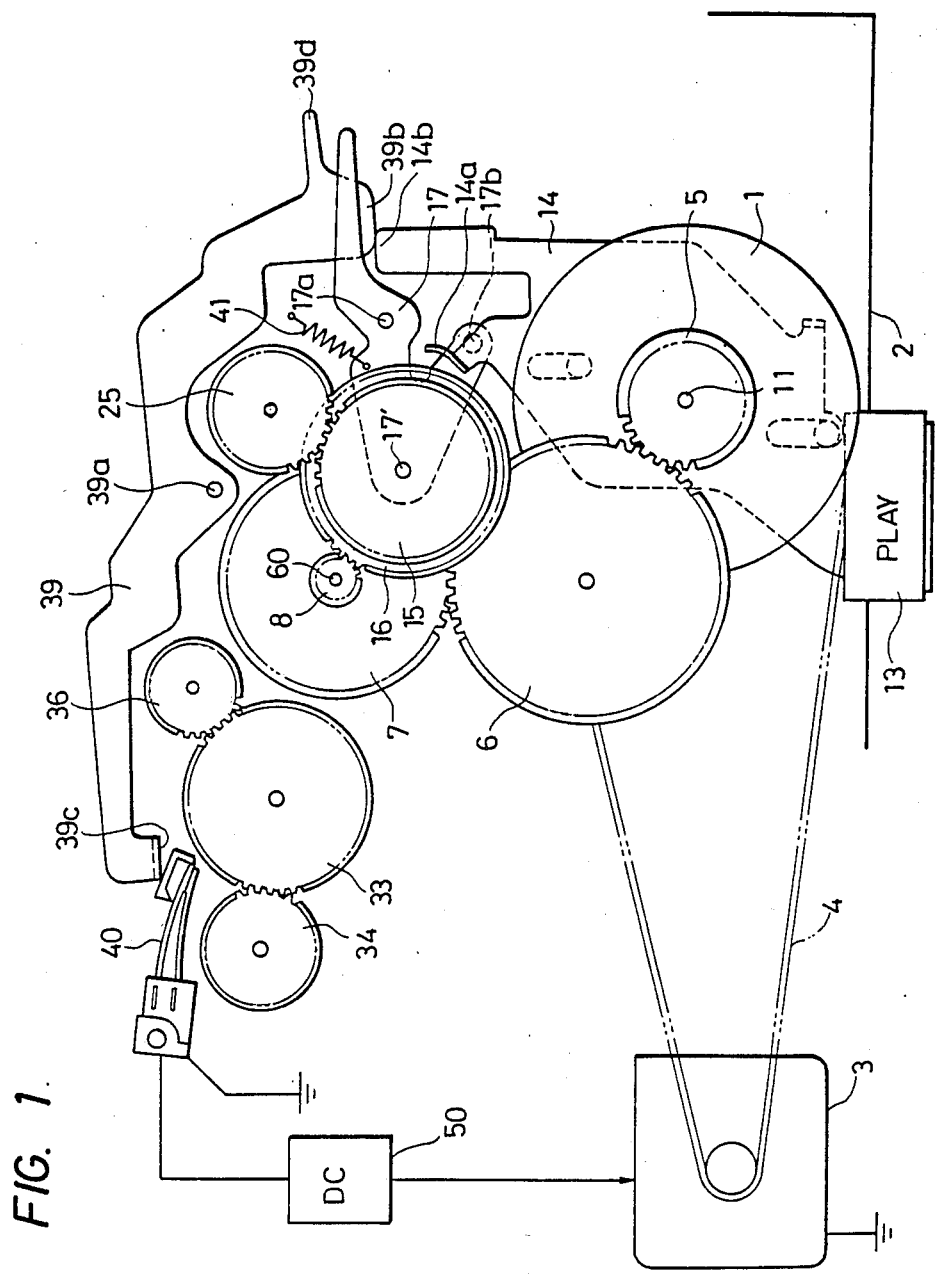
FIG. 1 is a plan view illustrating part of the tape recorder mechanism of the invention with a playback function bar in a working position.

A playback bar 14, having a playback button 13 attached thereto, includes a latch 14a which normally engages with a cam pin 17b of the bell crank 17 when that function bar is in the nonworking position so that the bell crank 17 is rotated counterclockwise against spring 41 to keep the gears 15 and 16 out of contact with gears 25 and 8, respectively. When the playback bar 14 is depressed forward to the working position as illustrated in FIG. 1, the bell crank 17 is unlatched and rotates clockwise by the action of spring 41 to thereby allow gears 15 and 16 to come into mesh with takeup gear 25 and drive gear 8, respectively.

The lever 39, pivoted at 39a, has a first arm portion 39b engageable with an arm portion 14b of the playback bar 14 and a second arm portion 39c engageable with a pair of normally open contacts of a power switch 40. The lever 39 is rotated counterclockwise when the playback bar 14 is moved into the working position to close the switch 40. As a result, DC voltage is applied from source 50 to the motor 3 and the flywheel 1 is set in rotation. The motor driven torque is therefore transmitted by way of flywheel 1, gears 5 and 6 and by way of the second slip-friction gear assembly to the takeup gear 25.

The playback bar 14 will be released into the nonworking position by means of a known release mechanism triggered by a stop bar, not shown. With the playback bar 14 being restored, the lever 39 rotates clockwise to open the switch 40, de-energizing the motor 3.

Figure 3:
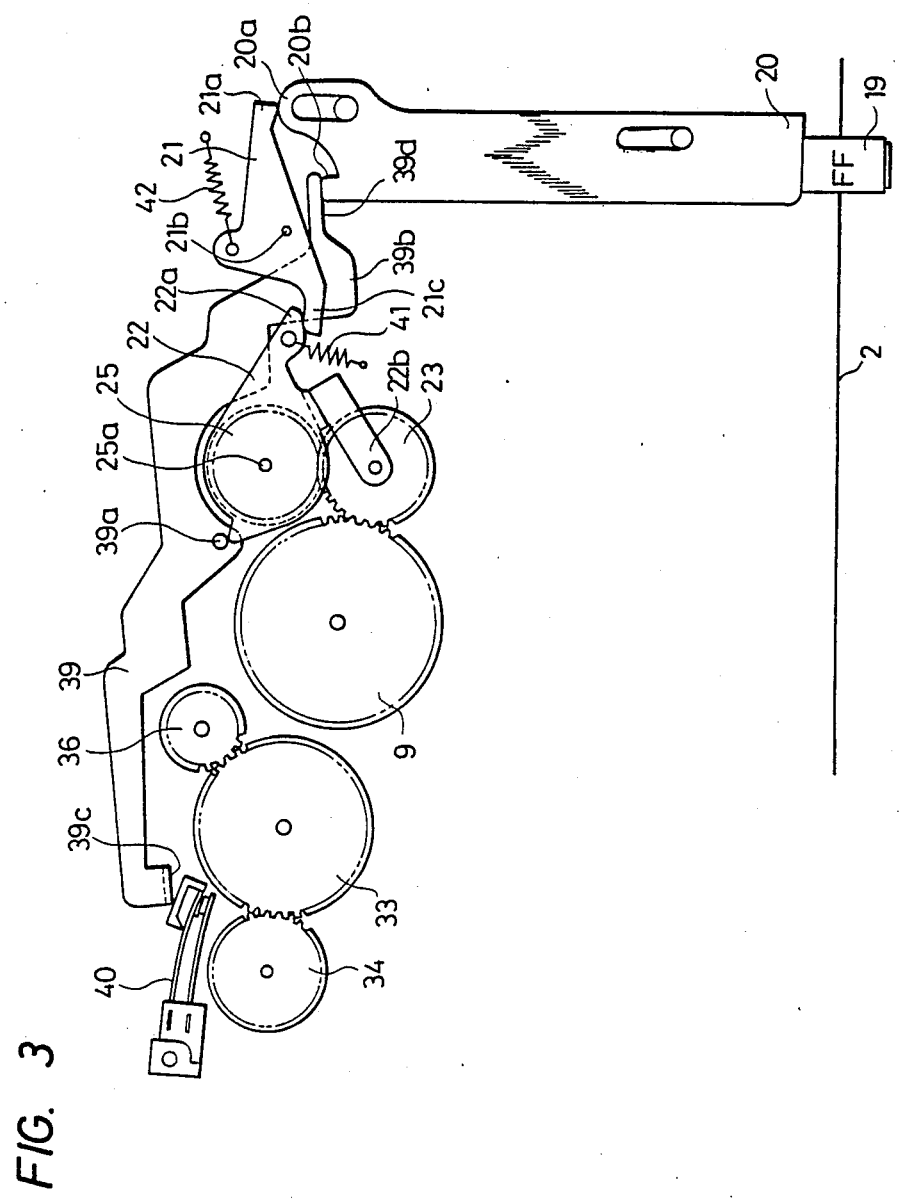
FIG. 3 is a plan view illustrating a fast-forward function bar in a working position.

In FIG. 3, a fast-forward bar 20, having a button 19 attached thereto, has a portion 20a engageable with a first arm 21a of a bell crank 21 pivoted at 21b and a portion 20b engageable with the left end portion of an arm 39d of lever 39 when the fast-forward button 19 is depressed into the working position. The lever 22 is pivoted at 25a which is coaxial with the takeup gear 25 and formed with an arm 22b which carries a spur gear 23 which is in mesh with the takeup gear 25. The bell crank 21 is normally biased counterclockwise by a spring 42 to engage its second arm 21c with an arm portion 22a of the lever 22 so that the latter is held in a first position in which the spur gear 23 is kept from engagement with the gear 9 of the first slip-friction gear assembly. Upon the forward movement of the fast-forward bar 20, the bell crank 22 is rotated clockwise and causes the spur gear 22 to engage with the slip-friction gear 9, while the lever 3 is caused to rotate counterclockwise to close the switch 40, energizing the motor 3 to set the gear 9 in rotation. Therefore, the motor driven is slip-frictionally coupled to the takeup gear 25 by way of the first slip-friction gear assembly including gears 7 and 9 and by way of gear 23 during this fast-forward mode, rather than by way of the second slip-friction gear assembly which comes into play during playback modes.

The cassette tape is driven at speeds higher than the speed at which the capstan (which is coupled to the shaft 11 of the flywheel 1) is driven, the speed being variable as a function of the diameter of the tape on the takeup reel of the cassette. With the increase in the diameter, the difference in speed between the gears 7 and 9 increases. However, this difference is absorbed by the slip-friction mechanism of the first gear assembly. This assembly also acts as a shock absorber when the tape motion is terminated and thus prevents the tape from being damaged.

Figure 4:
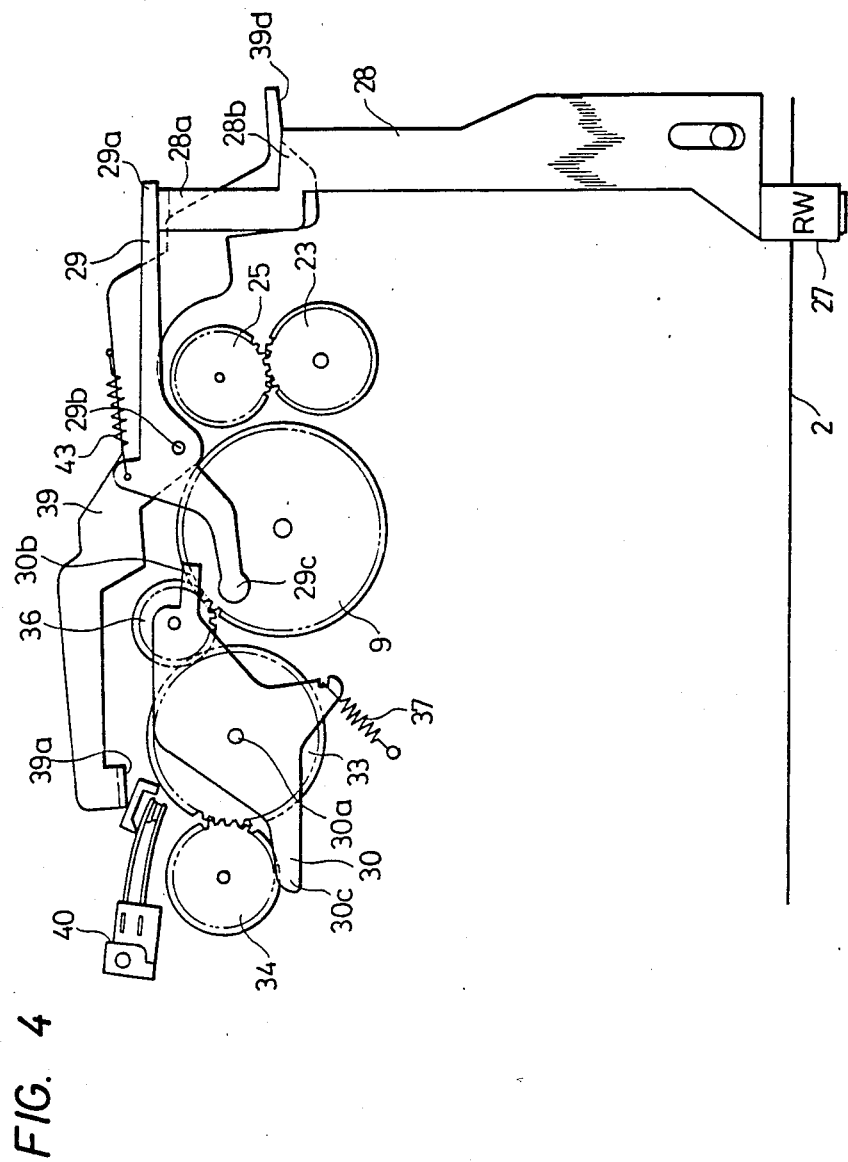
FIG. 4 is a plan view illustrating a rewind function bar being in a working position.
Figure 5:
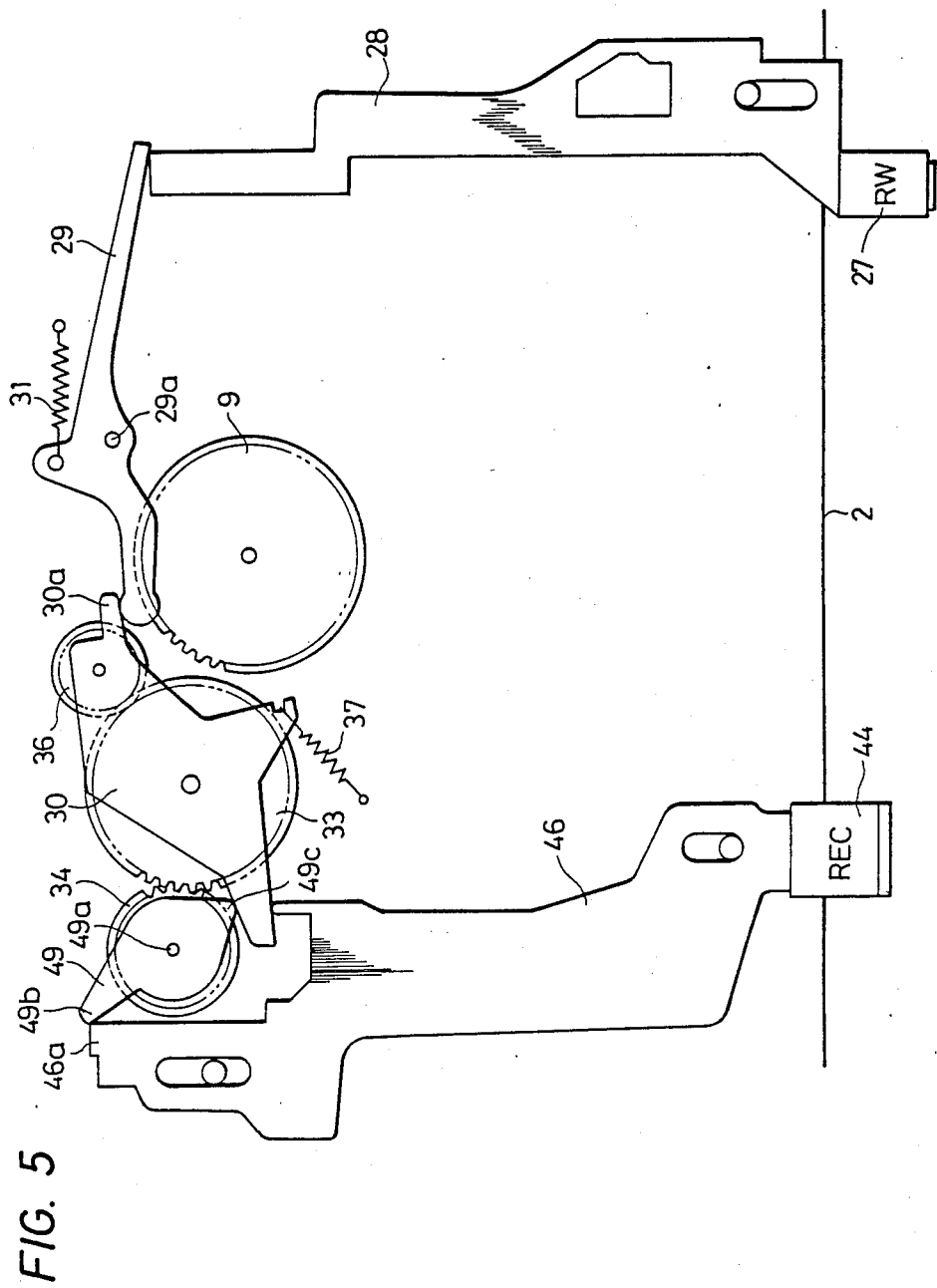
FIG. 5 is a plan view illustrating part of the mechanism with a record function bar being in a working position in relation to the rewind function bar in the nonworking position.

Referring to FIG. 4, a rewind bar 28 with a rewind button 27 attached thereto, has a first portion 28a engageable with a first arm 29a of a bell crank 29 which is pivoted at 29a and biased clockwise by a spring 43, and a second portion 28b engageable with the right end portion of the arm 39d of lever 39 when bar 28 is pushed forward into the working position as illustrated. A bell crank 30, pivoted at 30a coaxially with a spur gear 33, is biased clockwise by a spring 37. The spur gear 33 is in mesh with a tape supply gear 34 on which a tape supply spindle 32 is mounted as shown in FIG. 2. The bell crank 30 has a first arm 30b on which it carries a small gear 36 which is in mesh with the larger gear 33. When the rewind bar 28 is in the nonworking position, the bell crank 29 is urged by spring 43 into a nonworking position in which its second arm 29c pushes the first arm 30b of the bell crank 30 to rotate it counterclockwise against spring 37, keeping the gear 36 out of engagement with the slip-friction gear 9, as shown in FIG. 5. Upon forward movement of the rewind bar 28, the bell crank 29 is rotated counterclockwise against spring 43. Bell crank 33 is caused to rotate clockwise by the action of spring 37 until the small gear 36 comes into meshing engagement with the gear 9 as shown in FIG. 4. The motor driven torque is therefore transmitted by way of the first slip-friction gear assembly as in the fast-forward mode and by way of gear 36 and 33 to the rewind gear 34.

FIG. 5 illustrates a record bar 46 with a button 44 in the working position. A bell crank 49 is mounted on a pivot 49a which is coaxial with the supply gear 34. The bell crank 49 has an arm 49b engageable with an end 46a of the record bar 46 in the nonworking position as shown in FIG. 5 and a cam portion 49c which is in contact with a second arm 30c of the bell crank 30. When the record bar 46 is moved to the working position (FIG. 5) with the playback bar 14 also operated, the bell crank 49 is rotated clockwise. The cam portion 49c of this bell crank turns the bell crank 30 counterwise to keep the gear 36 from engagement with the drive gear 9.

Figure 6:
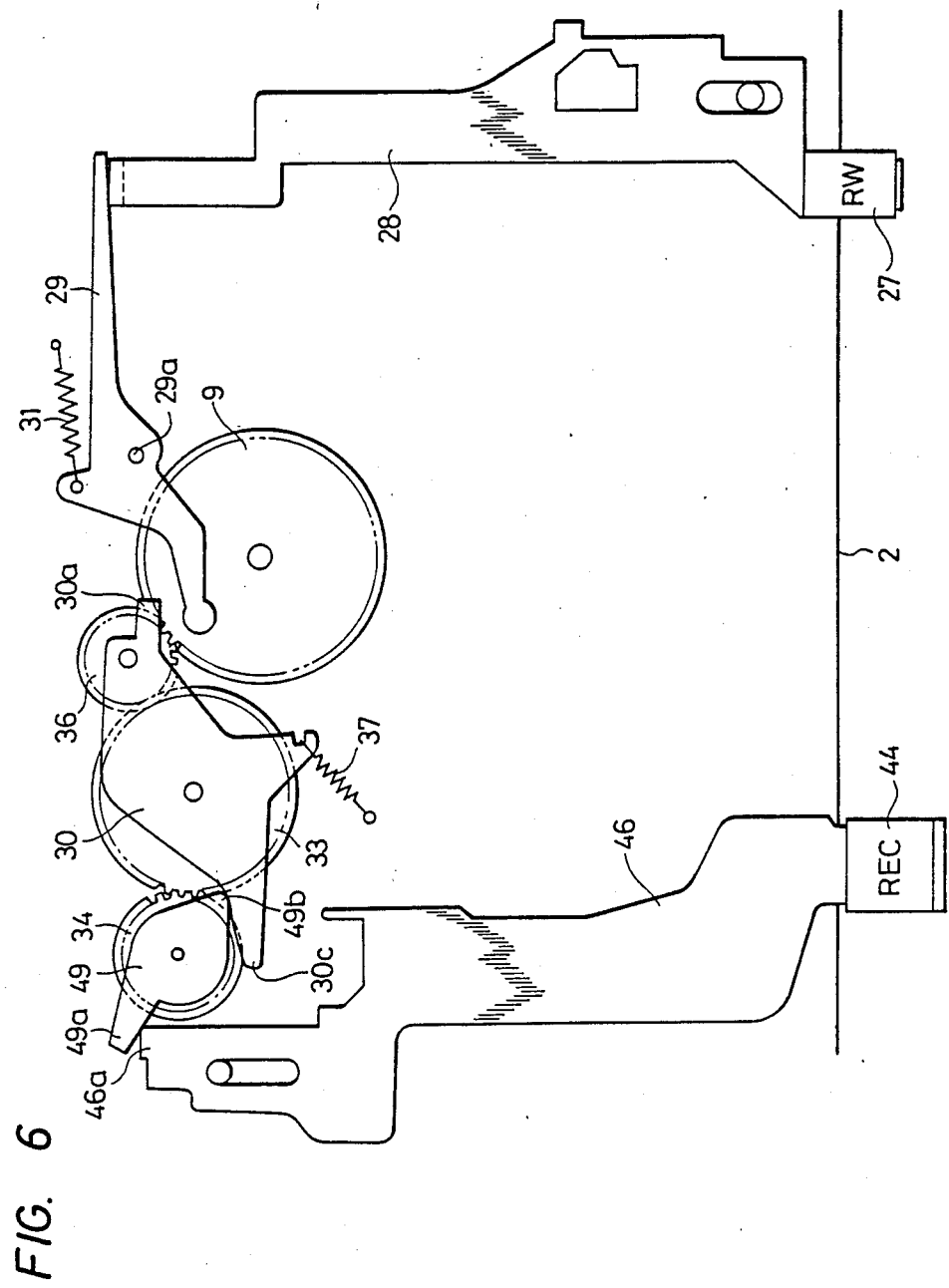
FIG. 6 is a plan view of the operating positions of the elements of FIG. 5 when the rewind function bar is operated.

If the rewind bar 28 is operated with the record bar 46 being in the working position, the bell crank 30 is caused to rotate clockwise turning the bell crank 49 counterclockwise and the record bar 46 is restored to the nonworking position as illustrated in FIG. 6. After the record mode is terminated, the gear 36 comes into mesh with the drive gear 9 to couple its torque to the supply gear 34.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A mechanism for tape recording/reproducing apparatus, comprising:

a plurality of manually operated playback, fast-forward and rewind function bars for effecting playback, fast-forward, and rewind operations, each of said bars being movable from a nonworking position to a working position in response to manual operation;

a supply gear coaxially coupled to a spindle adapted for coupling with a first tape reel;

a takeup gear coaxially coupled to a spindle adapted for coupling with a second tape reel;

a first gear assembly including a first gear driven by a motor, a second gear located in coaxial relationship with said first gear and first slip-frictionally coupling means positioned between said second gear and said first gear;

a second gear assembly including a pair of third and fourth gears, second slip-frictionally coupling means positioned between said third and fourth gears and means operable in response to said playback function bar; wherein, when said playback function bar is moved to the working position, said third and fourth gears are engaged to said first gear and said takeup gear, respectively, for transmitting the rotation of said motor to the takeup gear through said first gear, said third gears, said second slip-frictionally coupling means and said fourth gear;

a third gear assembly operable in response to said fast-forward function bar; wherein, when said fast-forward function bar is moved to the working position, said second gear is engaged to said takeup gear for transmitting the rotation of said motor to the takeup gear through said first gear, said first slip-frictionally coupling means and said second gear; and a fourth gear assembly operable in response to said rewind function bar; wherein, when said rewind function bar is moved to the working position, said second gear is engaged to said supply gear for transmitting the rotation of the motor to the supply gear through said first gear, said first slip-frictionally coupling means and said second gear.

2. A mechanism as claimed in claim 1, further comprising:

a manually operated record function bar movable between a nonworking position and a working position for operating the apparatus in a recording mode; and means engaged with said record function bar for preventing said fourth gear assembly from engaging said second gear with said takeup gear in response to said rewind function bar being moved to the working position when said record function bar is still in the working position.

3. A mechanism as claimed in claim 1, wherein said third gear assembly comprises:

a lever having an arm portion, a first pivot about which the lever is rotatable and a second pivot on said arm portion;

a fifth gear rotatably mounted on said first pivot in mesh with either said second gear or said takeup gear;

a sixth gear rotatable about said second pivot in mesh with said fifth gear;

spring means for urging said lever in a direction tending to keep said sixth gear in contact with whichever one of said second gear or takeup gear not in mesh with said fifth gear; and means for latching said lever against said spring means in a position wherein said sixth gear is disengaged from contact with whichever one of said second gear or takeup gear when said rewind function bar is in the nonworking position and unlatching said first lever in response to said fast-forward function bar being moved to the working position.

4. A mechanism as claimed in claim 1, wherein said fourth gear assembly comprises:

a lever having an arm portion, a first pivot about which the lever is rotatable and a second pivot on said arm portion;

a fifth gear rotatably mounted on said first pivot in mesh with either said second gear or said supply gear;

a sixth gear rotatable about said second pivot in mesh with said fifth gear;

spring means for urging said lever in a direction tending to keep said sixth gear in contact with whichever one of said second gear or said supply gear not in mesh with said fifth gear; and means for latching said lever against said spring means in a first position wherein said sixth gear is disengaged from contact with whichever one of said second gear or said supply gear when said rewind function bar is in the nonworking position and unlatching said first lever in response to said rewind function bar being moved to the working position.

5. A mechanism as claimed in claim 2, wherein said fourth gear assembly comprises:

a first lever having first and second arm portions, a first pivot about which the first lever is rotatable and a second pivot on said first arm portion;

a fifth gear rotatably mounted on said first pivot in mesh with either said second gear or said supply gear;

a sixth gear rotatable about said second pivot in mesh with said fifth gear;

spring means for urging said first lever in a direction tending to keep said sixth gear in contact with whichever one of said second gear or said supply gear not in mesh with said fifth gear; and means for latching said first lever against said spring means in a noncontact position wherein said sixth gear is disengaged from contact with the whichever one of said second gear or said supply gear when said rewind function bar is in the nonworking position and unlatching said first lever in response to said rewind function bar being moved to the working position, and wherein said preventing means includes:

a second lever having first and second arm portions and a pivot therebetween, said first arm portion being engaged with said record function bar so that said second arm portion of the second lever engages the second arm portion of the first lever to keep same in said noncontact position, whereby the movement of said rewind function bar to the working position during the time said record function bar is in the working position enables said second lever to hold said first lever in said noncontact position until said record function bar is moved to the nonworking position.

* * * * *